(12) United States Patent
Bauerle et al.

(10) Patent No.: US 7,263,429 B2
(45) Date of Patent: Aug. 28, 2007

(54) CRUISE IDLE SPEED CONTROL TO ENHANCE LOW SPEED AND LIGHT THROTTLE DRIVABILITY

(75) Inventors: Paul A. Bauerle, Fenton, MI (US); Matthew Squire, Fenton, MI (US); Joseph M. Stempnik, Warren, MI (US); Sharon L. Storch, Brighton, MI (US); David A. Stamm, Howell, MI (US); Kevin T. Sharples, Pinkney, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 11/285,678

(22) Filed: Nov. 21, 2005

(65) Prior Publication Data

US 2007/0038358 A1 Feb. 15, 2007

Related U.S. Application Data

(60) Provisional application No. 60/707,237, filed on Aug. 11, 2005.

(51) Int. Cl.
*G06F 19/00* (2006.01)
*B60T 8/32* (2006.01)

(52) U.S. Cl. .......... 701/110; 701/93; 123/319; 123/399

(58) Field of Classification Search ............ 701/110, 701/112, 113, 114; 123/319, 323, 342, 351, 123/399, 399.23
See application file for complete search history.

(56) References Cited

U.S. PATENT DOCUMENTS

| | | | | |
|---|---|---|---|---|
| 5,121,324 A | * | 6/1992 | Rini et al. | 701/105 |
| 5,307,777 A | * | 5/1994 | Sasajima et al. | 123/399 |
| 5,961,566 A | * | 10/1999 | Heslop | 701/93 |
| 5,999,875 A | * | 12/1999 | Bruedigam et al. | 701/110 |
| 6,339,741 B1 | * | 1/2002 | Ritter et al. | 701/110 |

* cited by examiner

Primary Examiner—Willis R. Wolfe
Assistant Examiner—Johnny H. Hoang

(57) ABSTRACT

An engine control system that regulates operating of an engine of a motor vehicle includes a first module that determines whether a throttle of the motor vehicle is closed and a second module that determines whether the engine is idling while a cruise control is active. A third module selectively inhibits an RPM-based idle speed control of the engine if the throttle is closed and the engine is idling while the cruise control is active.

15 Claims, 5 Drawing Sheets

CRUISE IDLE SPEED CONTROL TO ENHANCE LOW SPEED AND LIGHT THROTTLE DRIVABILITY

CROSS-REFERENCE TO RELATED APPLICATIONS

This application claims the benefit of U.S. Provisional Application No. 60/707,237, filed on Aug. 11, 2005. The disclosure of the above application is incorporated herein by reference.

FIELD OF THE INVENTION

The present invention relates to internal combustion engines, and more particularly to a cruise idle speed control system.

BACKGROUND OF THE INVENTION

Internal combustion engines combust a fuel and air mixture within cylinders driving pistons to produce drive torque. The engine drives a transmission through a coupling device. Air is drawn into the engine and is metered through a throttle. The engine is operated based on a desired air-to-fuel (A/F) ratio. In some instances, the A/F ratio is lean (i.e., reduced fuel) and in other instances, the A/F ratio is rich (i.e., increased fuel). An ignition system initiates combustion of the A/F mixture within cylinders. During vehicle operation, periods of engine idle occur. Engine idle occurs when there is low engine load and there is little or no operator throttle input (i.e., operator not rewing the engine).

Traditional engine control systems include a throttle closed flag that indicates when the throttle is in a closed position. During periods where cruise control is used (e.g., adaptive or standard), interactions between the throttle closed flag and the cruise control can cause drivability and business issues. More specifically, under light engine loads when the throttle closed flag is not true (i.e., the throttle is not considered close), idle speed control operates in a throttle follower mode. In the throttle follower mode spark advance is used, which results in higher engine torque output. If the throttle closed flag goes true (i.e., throttle in closed position), idle speed control transitions to a coast down mode, which retards spark to provide an engine torque reserve and to reduce engine emissions.

Whenever cruise control is implemented and there is a light throttle input, the engine torque output can rapidly change as a result of the throttle closed flag transitioning to true. Thus, the engine control system opens the throttle to compensate and to regain the commanded torque value, resulting in repeated transitioning. This transitioning creates a sense of business and engine RPM oscillation.

SUMMARY OF THE INVENTION

Accordingly, the present invention provides an engine control system that regulates operating of an engine of a motor vehicle. The engine control system includes a first module that determines whether a throttle of the motor vehicle is closed and a second module that determines whether the engine is idling while a cruise control is active. A third module selectively inhibits an RPM-based idle speed control of the engine if the throttle is closed and the engine is idling while the cruise control is active.

In one feature, the first module sets a throttle closed flag to TRUE if a desired throttle area is less than a closed area threshold.

In another feature, the first module sets a throttle closed flag to FALSE if a desired throttle area is greater than a sum of a closed area threshold and an area offset.

In still another feature, the second module sets an idle flag to FALSE if the cruise control is not active.

In yet other features, the second module determines a vehicle speed differential and sets an idle flag based on the speed differential. The speed differential is determined as a difference of an actual vehicle speed and a cruise control set speed. The second module sets an idle flag to TRUE if the cruise control is active and the speed differential is less than a first speed differential threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
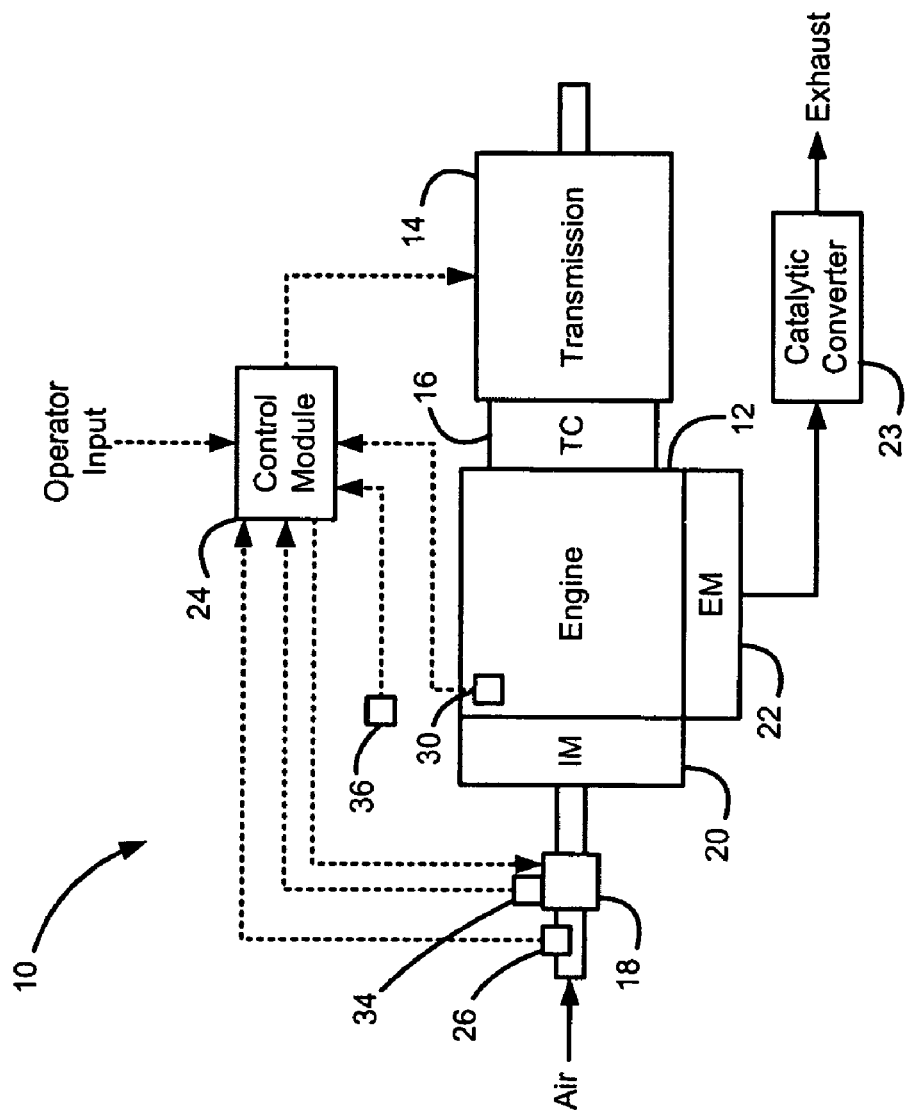
FIG. 1 is a functional block diagram of an exemplary engine system that is operated using a cruise idle speed control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle system 10 is illustrated. The vehicle system includes an engine 12 that drives a transmission 14 through a torque converter 16. More specifically, air is drawn through a throttle 18 into an intake manifold 20, which distributes air to cylinders (not shown). The air is mixed with fuel at a desired air-to-fuel (A/F) ratio and the A/F mixture is combusted within the cylinders to generate drive torque. The combustion products are exhausted from the engine 12 through an exhaust manifold 22 and are treated in a catalytic converter 23 before being released to atmosphere.

A control module 24 regulates operation of the engine 12 based on various engine operating parameters. A mass air flow (MAF) sensor generates a MAF signal based on the MAF into the engine 12. An engine RPM sensor 30 generates an RPM signal based on the rotational velocity of a crankshaft (not shown) of the engine 12. A throttle position sensor 34 generates a throttle position signal (TPS) indicative of a driver's throttle input. A vehicle speed sensor 36 generates a vehicle speed signal ($V_{VEH}$). It is anticipated that the vehicle speed sensor 36 can include, but is not limited to, an ABS sensor that is responsive to rotation of a wheel (not shown).

The control module 24 can operate the engine in one of a throttle follower mode and an idle RPM control mode. The throttle follower mode prevents the engine 12 from stalling when the throttle goes from an open position to a closed position. During periods of engine idle, the control module 24 regulates the throttle to maintain a desired engine idle speed ($RPM_{IDLE}$). However, as the throttle opens further and engine RPM goes above the targeted idle speed, the throttle actuator completely closes the throttle in an attempt to bring engine speed back to its targeted value. While operating in the throttle follower mode, a throttle follower is used to set a minimum throttle position (i.e., extends the throttle stop outward). An exemplary throttle follower is described in further detail in commonly assigned U.S. Pat. No. 4,848, 189, entitled Engine Throttle Stop Control System, the disclosure of which is expressly incorporated herein by reference. The throttle follower gradually retracts to provide a desired coast-down throttle angle until engine operation transitions to the idle RPM control mode.

The control module 24 also regulates operation of the engine 12 in a cruise control mode (e.g., adaptive or standard) based on an operator input. More specifically, when the operator engages cruise control (i.e., ON), the control module 24 regulates operation of the engine 12 to maintain a desired vehicle speed ($V_{DES}$)

The cruise idle speed control of the present invention selectively inhibits transition to the idle RPM control. More specifically, the cruise idle speed control of the present invention includes a throttle closed flag ($FLAG_{THRCLOSED}$) and an idle flag ($FLAG_{IDLE}$). $FLAG_{THRCLOSED}$ is TRUE when a desired throttle area ($A_{DES}$) is less than a pre-defined closed throttle area ($A_{CLOSED}$). $A_{DES}$ is the final arbitrated throttle area generated by the cruise control and does not include an idle throttle area ($A_{IDLE}$). $A_{IDLE}$ is a minimum throttle opening, at which the engine 12 idles. $FLAG_{IDLE}$ is TRUE when cruise control is ON and a vehicle speed difference ($V_{DIFF}$) is less than a first vehicle speed difference threshold ($\Delta V_{THR1}$). $V_{DIFF}$ is calculated as the difference between the actual vehicle speed ($V_{VEH}$) and a cruise set speed ($V_{CRUISE}$). $FLAG_{THRCLOSED}$ is FALSE when $A_{DES}$ is greater than the sum of $A_{CLOSED}$ and an offset throttle area ($A_{OFFSET}$). $FLAG_{IDLE}$ is FALSE when either cruise control is OFF or $V_{DIFF}$ is greater than a second vehicle speed difference threshold ($\Delta V_{THR2}$). When both $FLAG_{THRCLOSED}$ and $FLAG_{IDLE}$ are set to TRUE, idle RPM control is inhibited. In this manner, repeated transitioning between operating modes of the engine 12 and the resulting oscillations are prevented.

Figure 2:
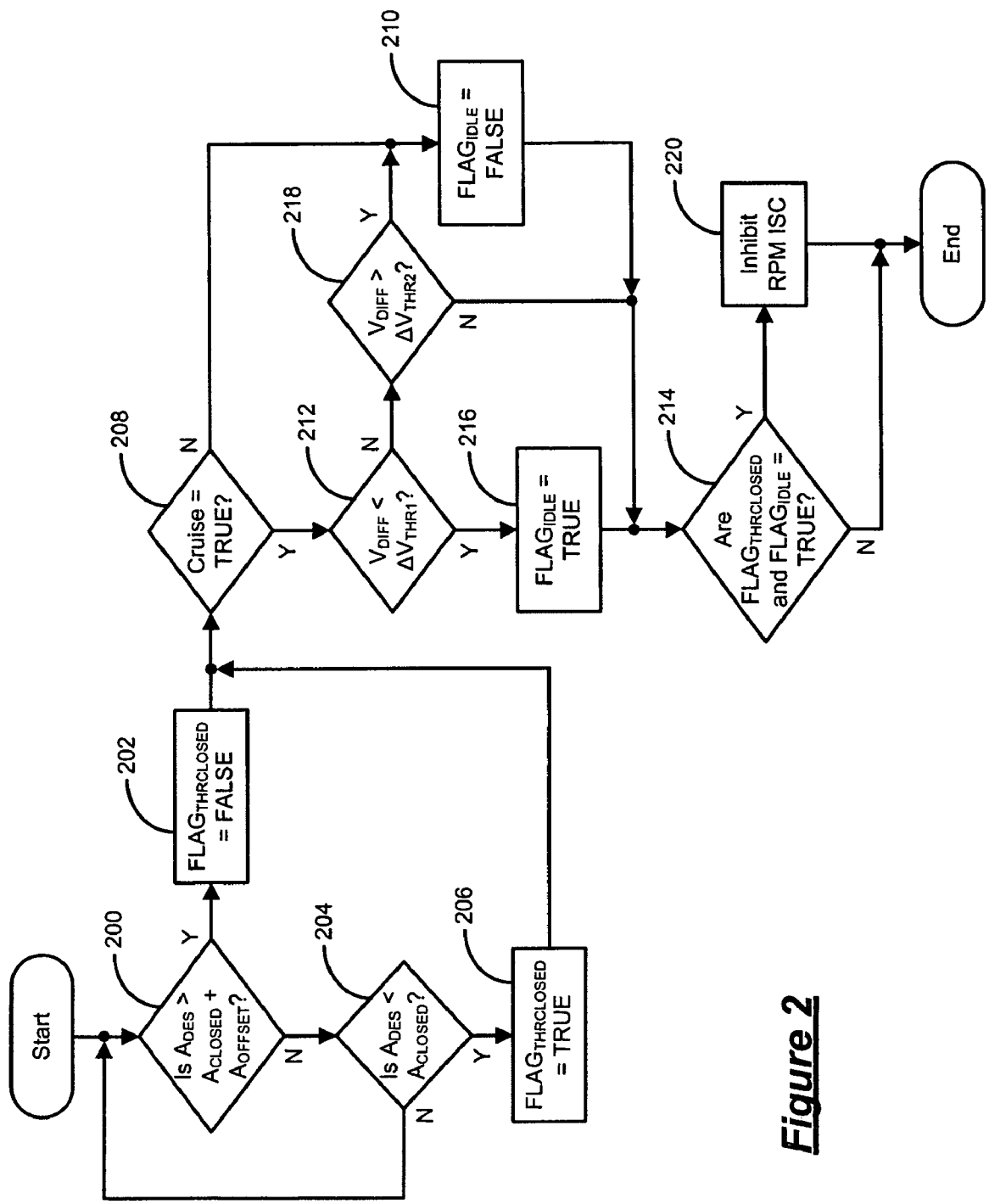
FIG. 2 is a flowchart illustrating exemplary steps executed by the cruise idle speed control of the present invention.

Referring now to FIG. 2, exemplary steps executed by the cruise idle speed control of the present invention will be described in detail. In step 200, control determines whether $A_{DES}$ is greater than the sum of $A_{CLOSED}$ and $A_{OFFSET}$. If $A_{DES}$ is greater than the sum of $A_{CLOSED}$ and $A_{OFFSET}$, control continues in step 202. If $A_{DES}$ is not greater than the sum of $A_{CLOSED}$ and $A_{OFFSET}$, control continues in step 204. Controls sets $FLAG_{THRCLOSED}$ equal to FALSE in step 202, indicating that the throttle is not closed. In step 204, control determines whether $A_{DES}$ is less than $A_{CLOSED}$. If $A_{DES}$ is less than $A_{CLOSED}$, control sets $FLAG_{THRCLOSED}$ to TRUE in step 206, indicating that the throttle is closed. If $A_{DES}$ is not less than $A_{CLOSED}$, control loops back to step 200.

In step 208, control determines whether a cruise control flag ($FLAG_{CRUISE}$) is equal to TRUE. If $FLAG_{CRUISE}$ is not TRUE, control continues in step 210. If $FLAG_{CRUISE}$ is TRUE, control continues in step 212. In step 210, control sets $FLAG_{IDLE}$ equal to FALSE and continues in step 214. Control determines whether $V_{DIFF}$ is less than $\Delta V_{THR1}$ in step 212. If $V_{DIFF}$ is less than $\Delta V_{THR1}$, control sets $FLAG_{IDLE}$ equal to TRUE in step 216 and continues in step 214. If $V_{DIFF}$ is not less than $\Delta V_{THR1}$, control determines whether $V_{DIFF}$ is greater than $\Delta V_{THR2}$ in step 218. If $V_{DIFF}$ is greater than $\Delta V_{THR2}$, control sets $FLAG_{IDLE}$ equal to FALSE in step 210 and continues in step 214. If $V_{DIFF}$ is not less than $\Delta V_{THR1}$, control continues in step 214.

In step 214, control determines whether both $FLAG_{THRCLOSED}$ and $FLAG_{IDLE}$ are TRUE. If both $FLAG_{THRCLOSED}$ and $FLAG_{IDLE}$ are TRUE, control inhibits RPM idle speed control in step 220 and ends. If either $FLAG_{THRCLOSED}$ or $FLAG_{IDLE}$ are not TRUE, control ends. It is anticipated that the cruise idle speed control of the present invention is continuously executed based on a processing loop (e.g., every 12.5 ms), while the engine is operating.

Figure 3:
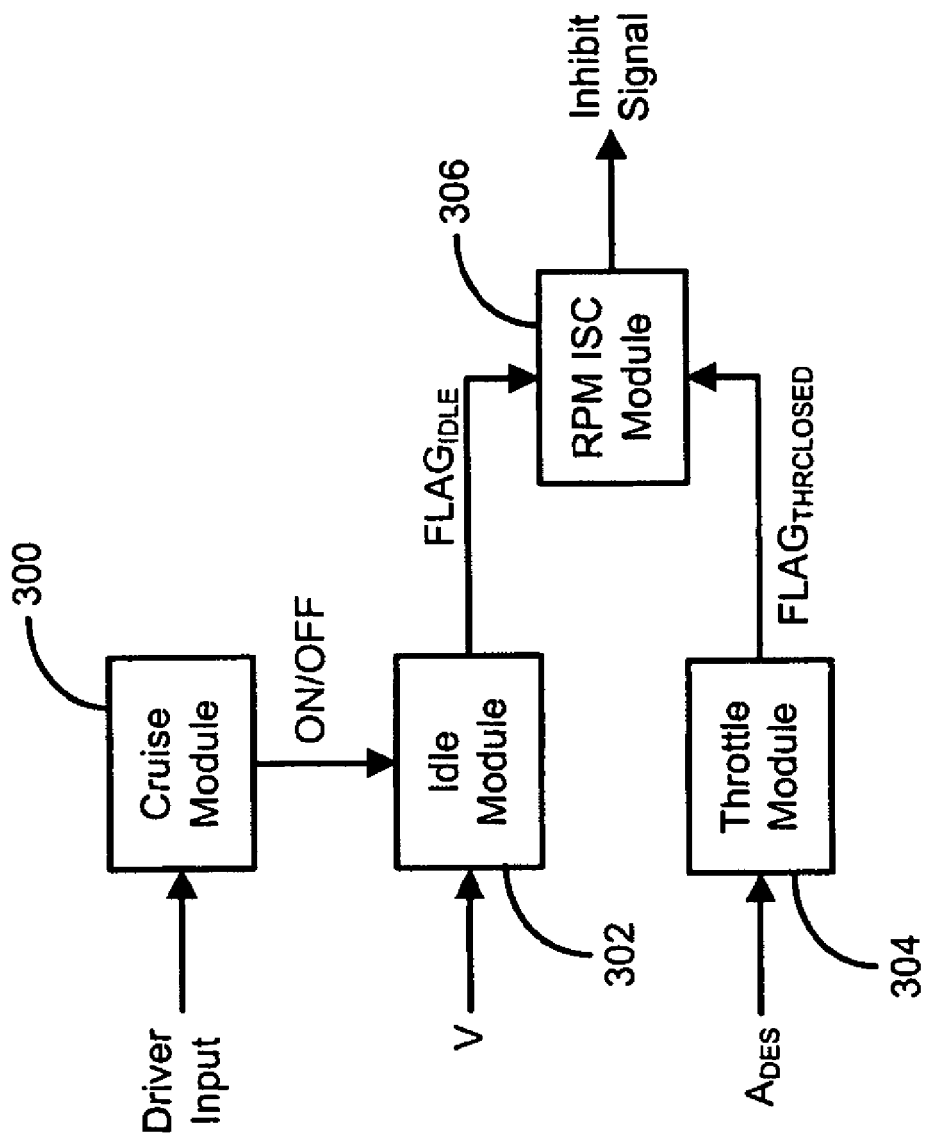
FIG. 3 is a functional block diagram of exemplary modules that execute the cruise idle speed control of the present invention.

Referring now to FIG. 3, exemplary modules that execute the cruise idle speed control will be described in detail. The exemplary modules include a cruise module 300, an idle module 302, a throttle module 304 and an RPM idle speed control module 306. The cruise module 300 selectively generates a cruise ON or OFF signal based on a driver input (e.g., when the driver initiates cruise control, the cruise ON signal is generated). The idle module 302 sets $FLAG_{IDLE}$ to one of TRUE and FALSE based on the cruise ON/OFF signal and the vehicle speed ($V_{VEH}$), as described in further detail above.

The throttle module 304 sets $FLAG_{THRCLOSED}$ to one of TRUE and FALSE based on $A_{DES}$, as discussed in detail above. The RPM ISC module selectively generates an inhibit signal based on $FLAG_{IDLE}$ and $FLAG_{THRCLOSED}$. More specifically, if $FLAG_{IDLE}$ and $FLAG_{THRCLOSED}$ are both TRUE, RPM ISC is inhibited.

Figure 4:
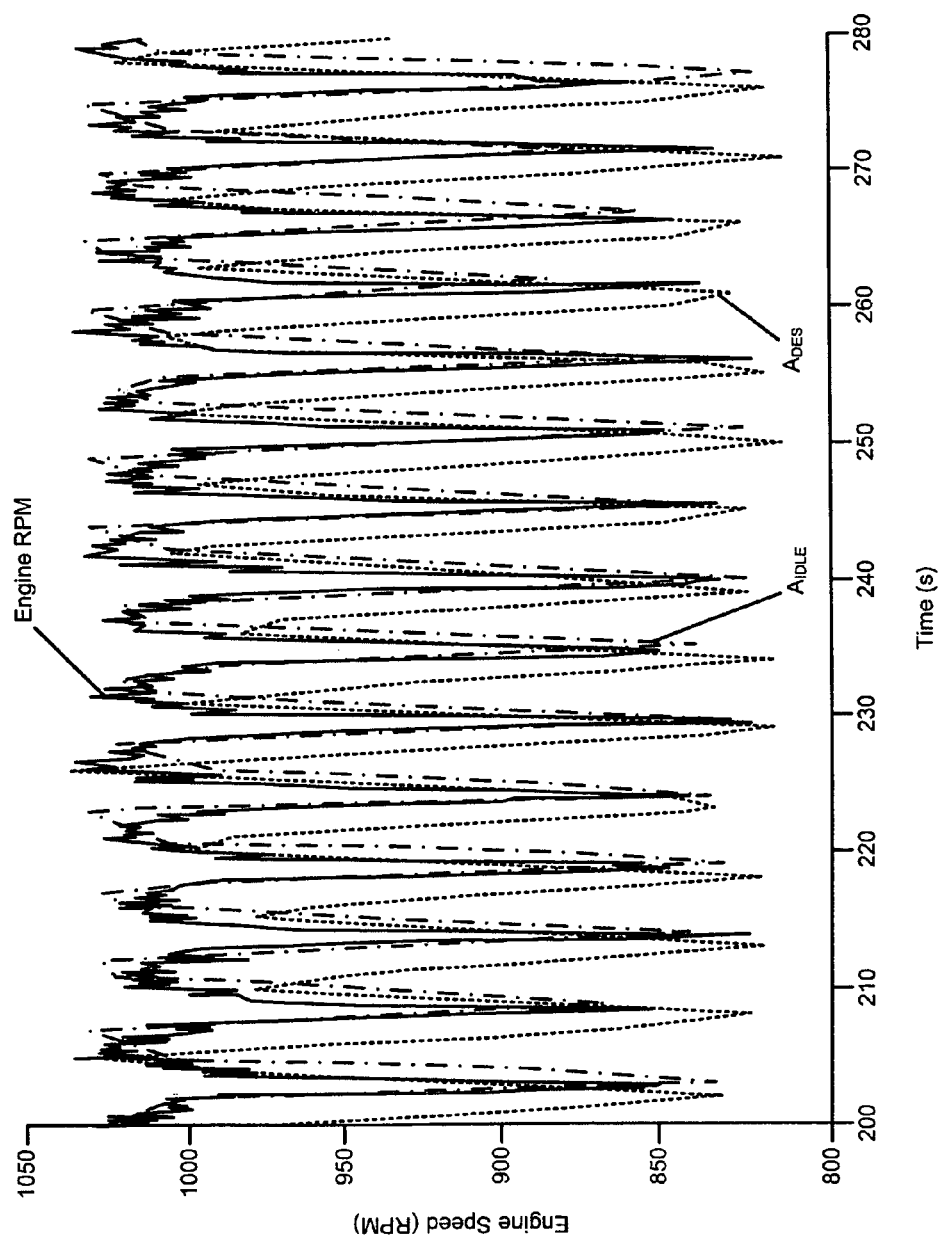
FIG. 4 is a graph illustrating traces of exemplary engine operating parameters using traditional idle speed control.
Figure 5:
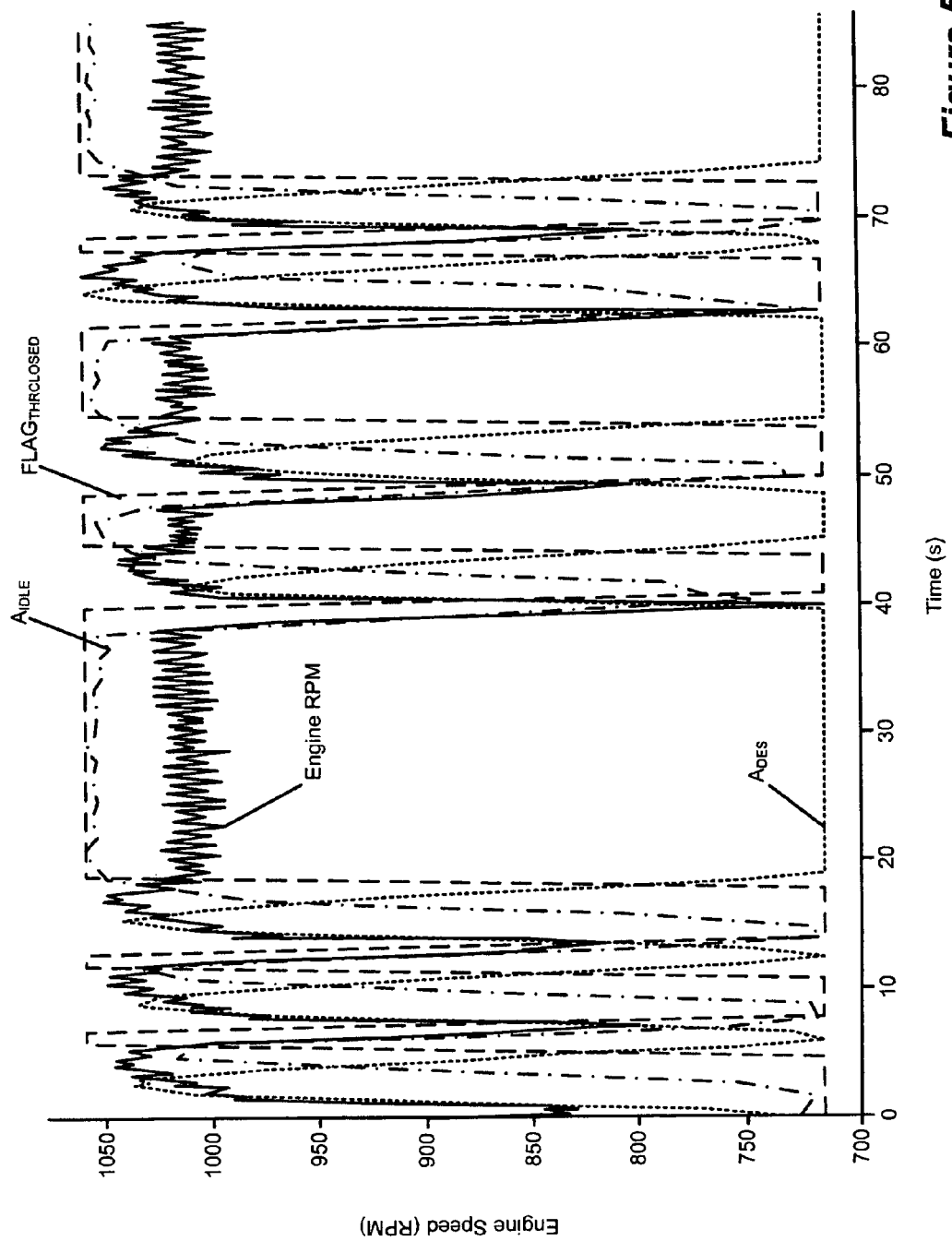
FIG. 5 is a graph illustrating traces of exemplary engine operating parameters using the cruise idle speed control of the present invention.

Referring now to FIGS. 4 and 5, graphs respectively illustrate exemplary engine operating parameters using traditional idle speed control (see FIG. 4) and the cruise idle speed control of the present invention (see FIG. 5). With particular reference to FIG. 4, the engine RPM significantly oscillates as the result of light throttle input and/or light engine load. More specifically, the torque output of the engine suddenly decreases because of the change in idle operating modes that result from $FLAG_{THRCLOSED}$ going TRUE (i.e., when $FLAG_{THRCLOSED}$ is TRUE, the throttle is opened to compensate and get back to a commanded torque value). With particular reference to FIG. 5, the engine RPM oscillations are reduced using the cruise idle speed control of the present invention. The reduced RPM oscillations result from the cruise idle speed control inhibiting idle RPM control when both the $FLAG_{THRCLOSED}$ and $FLAG_{IDLE}$ are TRUE.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system that regulates operating of an engine of a motor vehicle, comprising:
    a first module that determines whether a throttle of said motor vehicle is closed;
    a second module that determines whether said engine is idling while a cruise control is active and that determines a vehicle speed differential and sets an idle flap based on said speed differential, wherein said speed differential is determined as a difference of an actual vehicle speed and a cruise control set speed; and
    a third module that selectively inhibits an RPM-based idle speed control of said engine if said throttle is closed and said engine is idling while said cruise control is active.

2. The engine control system of claim 1 wherein said first module sets a throttle closed flag to TRUE if a desired throttle area is less than a closed area threshold.

3. The engine control system of claim 1 wherein said first module sets a throttle closed flag to FALSE if a desired throttle area is greater than a sum of a closed area threshold and an area offset.

4. The engine control system of claim 1 wherein said second module sets an idle flag to FALSE if said cruise control is not active.

5. The engine control system of claim 1 wherein said second module sets an idle flag to TRUE if said cruise control is active and said speed differential is less than a first speed differential threshold.

6. A method of regulating operation of an engine of a motor vehicle that is operable in a cruise ON mode and a cruise OFF mode, comprising:
    determining whether said motor vehicle is operating in said cruise ON mode;
    determining whether a throttle of said motor vehicle is closed;
    determining whether said engine is idling;
    determining a vehicle speed differential;
    setting an idle flag based on said speed differential, wherein said speed differential is determined as a difference of an actual vehicle speed and a cruise control set speed; and
    inhibiting an RPM-based idle speed control of said engine if said throttle is closed, said engine is idling and said motor vehicle is operating in said cruise ON mode.

7. The method of claim 6 wherein further comprising setting a throttle closed flag to TRUE if a desired throttle area is in than a closed area threshold.

8. The method of claim 6 wherein further comprising setting a throttle closed flag to FALSE if a desired throttle area is greater than a sum of a closed area threshold and an area offset.

9. The method of claim 6 further comprising setting an idle flag to FALSE if said motor vehicle is operating in said cruise OFF mode.

10. The method of claim 6 further comprising setting an idle flag to TRUE if said motor vehicle is operating in said cruise ON mode and said speed differential is less than a first speed differential threshold.

11. A method of regulating operation of an engine of a motor vehicle to inhibit engine speed oscillations, comprising:
    determining whether said motor vehicle is operating in one of a cruise ON mode and a cruise OFF mode;
    selectively setting a throttle closed flag to one of TRUE and FALSE based on a position of a throttle of said engine;
    selectively setting an idle flag to one of TRUE and FALSE at least partially based on a vehicle speed and one of said cruise On and cruise OFF modes;
    determining a vehicle speed differential;
    setting said idle flag based on said speed differential, wherein said speed differential is determined as a difference of an actual vehicle speed and a cruise control set speed; and
    inhibiting an RPM-based idle speed control of said engine if said throttle flag is TRUE and said idle flag is TRUE.

12. The method of claim 11 wherein said throttle closed flag is set to TRUE if a desired throttle area is less than a closed area threshold.

13. The method of claim 11 wherein said throttle closed flag is set to FALSE if a desired throttle area is greater than a sum of a closed area threshold and an area offset.

14. The method of claim 11 wherein said idle flag is set to FALSE if said motor vehicle is operating in said cruise OFF mode.

15. The method of claim 11 wherein said idle flag is set to TRUE if said motor vehicle is operating in said cruise ON mode and said speed differential is less than a first speed differential threshold.

* * * * *